United States Patent
Roberts

(10) Patent No.: US 6,473,618 B1
(45) Date of Patent: Oct. 29, 2002

(54) SYSTEM FOR ALLOCATING RADIO RESOURCES IN A MULTISERVICE MOBILE RADIO CELLULAR SYSTEM

(75) Inventor: Michaël Roberts, Neuilly s/Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/324,855

(22) Filed: Jun. 3, 1999

(30) Foreign Application Priority Data

Jun. 4, 1998 (FR) .............................................. 98 07011

(51) Int. Cl.$^7$ ................................................ H04Q 7/20
(52) U.S. Cl. ...................... 455/450; 455/422; 455/452; 455/447; 370/329; 370/340; 370/341; 380/260
(58) Field of Search ................................. 455/450, 452, 455/453, 446, 447, 448, 449; 450/422; 380/260; 370/329, 340, 341

(56) References Cited

U.S. PATENT DOCUMENTS 4,551,581 A * 11/1985 Doughty .................. 379/93.14
6,201,970 B1 * 3/2001 Suzuki et al. ............... 455/450

OTHER PUBLICATIONS

Stern, H.P and Sobol, H.: "Design and Performance Analysis of an Advanced Narrowband Integrated Voice/Data Mobile Radio System" IEEE Transactions on Communications, vol. 43, No. 1, Jan. 1, 1995, pp. 107–115, XP000487378.*

* cited by examiner

Primary Examiner—Daniel Hunter
Assistant Examiner—Alan T. Gantt
(74) Attorney, Agent, or Firm—Sughrue Mion, PLLC

(57) ABSTRACT

A system for allocation of radio resources to a mobile station, in a multiservice mobile radio cellular system, performs radio resource allocation for the various services independently. The radio resources are formed by transmission channels having multiple access provisions, using combinations of multiplexing techniques including frequency multiplexing. The system includes a coordination device for coordinating the allocation of radio resources for the various services accessed simultaneously by a mobile station, in order to allocate different channels carried by a single carrier frequency to the various services for the mobile station.

16 Claims, 4 Drawing Sheets

SYSTEM FOR ALLOCATING RADIO RESOURCES IN A MULTISERVICE MOBILE RADIO CELLULAR SYSTEM

The present invention relates in general to mobile radio cellular systems.

More particularly, the present invention relates to changes in such systems associated with the introduction of new services, in particular of the multimedia type.

BACKGROUND OF THE INVENTION

New high data rate services are presently being introduced into so-called "second generation" mobile radio cellular systems such as, in particular, the GSM system (for "global system for mobile communications"), in addition to the voice services and the low and medium data rate services already provided by such systems. Examples of such high data rate services comprise circuit mode data services such as high speed circuit switched data (HSCSD), or packet mode data services such as the general packet radio service (GPRS).

In parallel, changes are taking place towards so-called "third generation" systems, in particular the universal mobile telecommunication system (UMTS) that will make even higher data rates possible.

In general, and as shown in FIG. 1, a mobile radio cellular system can be represented as comprising a mobile radio cellular network itself comprising a radio access subsystem 1, serving essentially to manage radio and interface resources with mobile stations 2, and a network subsystem 3 serving essentially to manage calls and the interface with external networks 4, such as, in particular, the public switched telephone network (PSTN), the integrated services digital network (ISDN), etc.

In general, in a mobile radio cellular system, radio resources are allocated dynamically to mobile stations as a function of their requirements. More precisely, the radio resources allocated to a mobile station for a given service are selected by the radio access subsystem from a set of resources allocated to a given cell. The given cell is selected or reselected by the radio access subsystem in co-operation with the mobile station, with the mobile station having greater or lesser autonomy depending on circumstances, i.e. having a greater or smaller degree of control over the system in such co-operation. The various selection criteria used comprise, in particular, the radio resource requirements of the mobile station for the service under consideration, the availability of resources in various cells supporting the service, and the results of radio measurements for the various cells, for said service.

The resources allocated to a cell are also determined in application of known principles for sharing resources between cells within a cellular network, and they are also shared in fixed or dynamic manner between the various services supported by the cell.

Furthermore, in a mobile radio cellular system, radio resources are formed by "multiple-access" transmission channels, in particular using a combination of multiplexing techniques including frequency multiplexing. For example, in a system such as the GSM system, such combined multiplexing includes frequency multiplexing and time division multiplexing, with a transmission channel in this case being defined as a given time slot in a time division multiplex carried by a given carrier frequency.

A problem which arises with a mobile station that is accessing a plurality of services simultaneously, lies in the selected cell (and thus the frequency allocated in this way to the mobile station) possibly being different for the different services, in which case such a mobile station needs to be fitted with radio transceiver means suitable for switching very fast from one frequency to another, and possibly even for transmitting or receiving simultaneously on different frequencies. Such mobile stations suffer from the major drawback of being relatively complex and therefore expensive.

OBJECTS AND SUMMARY OF THE INVENTION

A particular object of the present invention is to avoid that drawback.

The present invention thus provides a system for allocation radio resources to a mobile station in a multiservice mobile radio cellular system in which radio resource allocation for the various services is performed independently, and in which the radio resources are formed by transmission channels having multiple access using combinations of multiplexing techniques including frequency multiplexing, the system essentially including coordination means for coordinating the allocation of radio resources for the various services accessed simultaneously by a mobile station, in order to allocate different channels carried by a single carrier frequency to the various services for said mobile station.

The present invention also provides a mobile station and an entity (such as a radio access sub-system) for a mobile radio cellular system that is usable in such a system.

BRIEF DESCRIPTION OF THE DRAWINGS

Other objects and characteristics of the present invention will appear on reading the following description of an embodiment, given with reference to the accompanying drawings, in which.

MORE DETAILED DESCRIPTION

Figure 1:
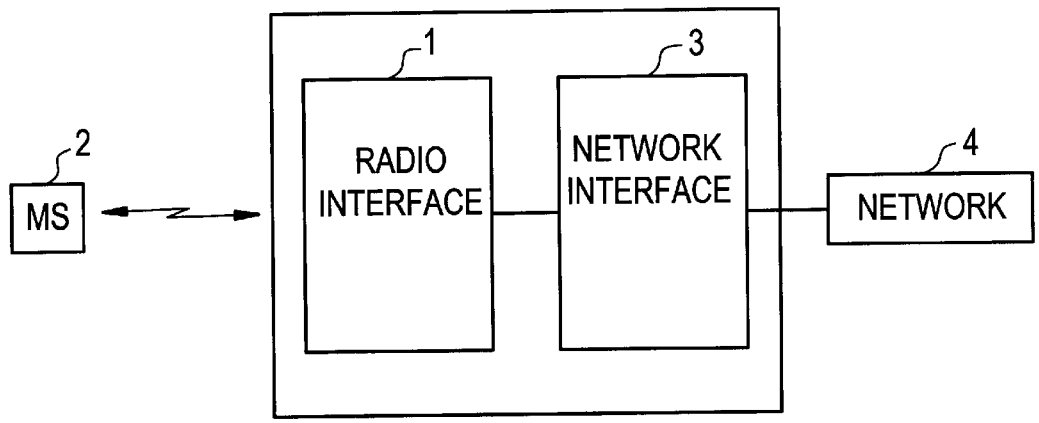
FIG. 1 shows the general architecture of a mobile radio cellular system.
Figure 2:
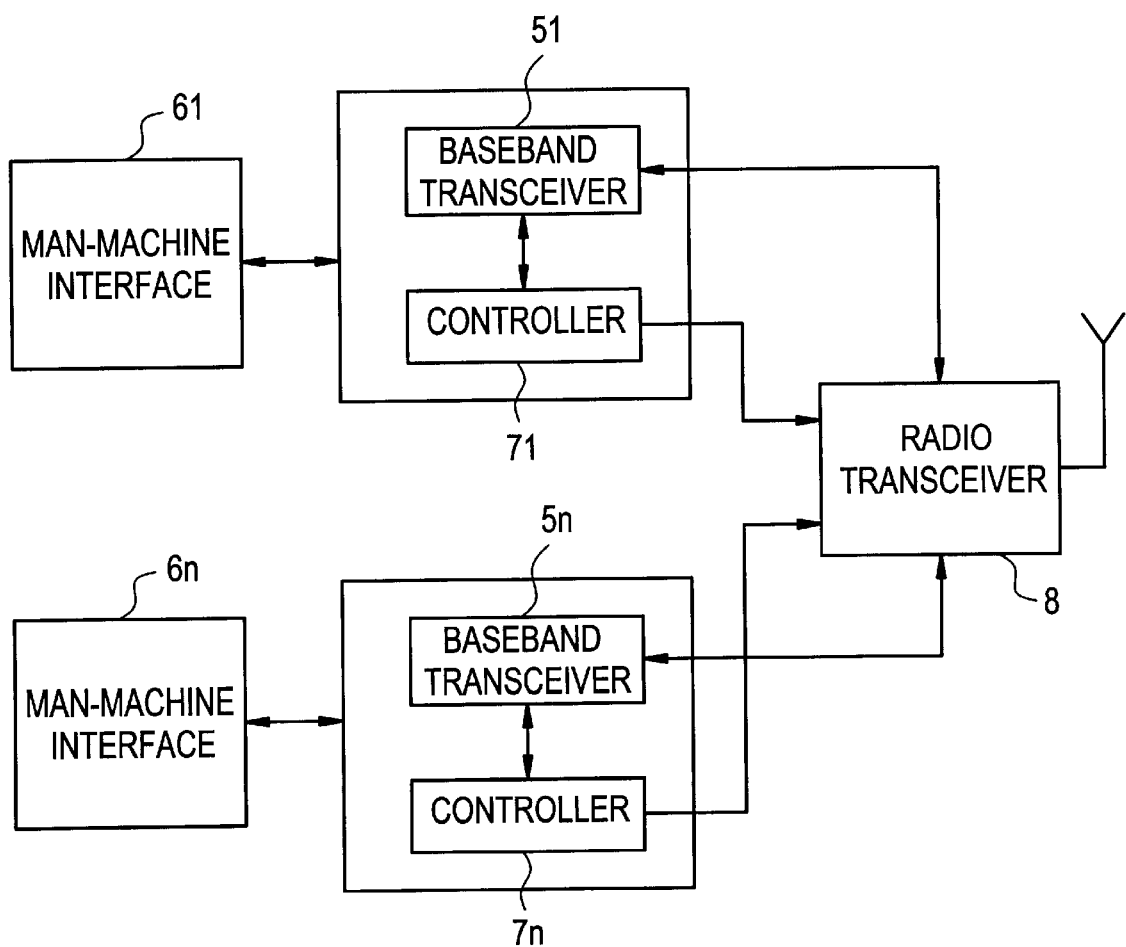
FIG. 2 shows the general architecture of a prior art mobile station in a multiservice radio cellular system.

As shown in FIG. 2, a mobile station essentially comprises the following for each of the n services to which it might need access:

baseband transceiver means such as 51 to 5n serving firstly to put information from man-machine interface means specific to the service under consideration, such as 61 to 6n, into a form which is acceptable for transmission over the radio interface, and secondly to reproduce information that has been received in this form over the radio interface in a form suitable for the man-machine interface means;

control means such as 71 to 7n serving in particular to transmit and receive the various kinds of signaling interchanged between the mobile station and the network in the various procedures or protocols provided to enable such a system to operate, and in particular in the presently-considered procedure of allocating radio resources, and more specifically, within this procedure:

when cell selection is performed in co-operation with the mobile stations, transmitting and receiving the corresponding signaling information; and in all cases, receiving signaling information from said radio access subsystem and specifying the radio resources allocated to the mobile station for the service.

As also shown in FIG. 2, mobile stations also have radio transceiver means 8 operating at a frequency which is controlled as a function of the radio resources allocated to the mobile station for the various services.

As mentioned above, in the prior art, these radio transceiver means in a mobile station suitable for accessing a plurality of the n services simultaneously, need to be capable of switching very quickly from one frequency to another, and even of transmitting or receiving simultaneously on two different frequencies, giving rise to the drawbacks that have already been mentioned.

Figure 3:
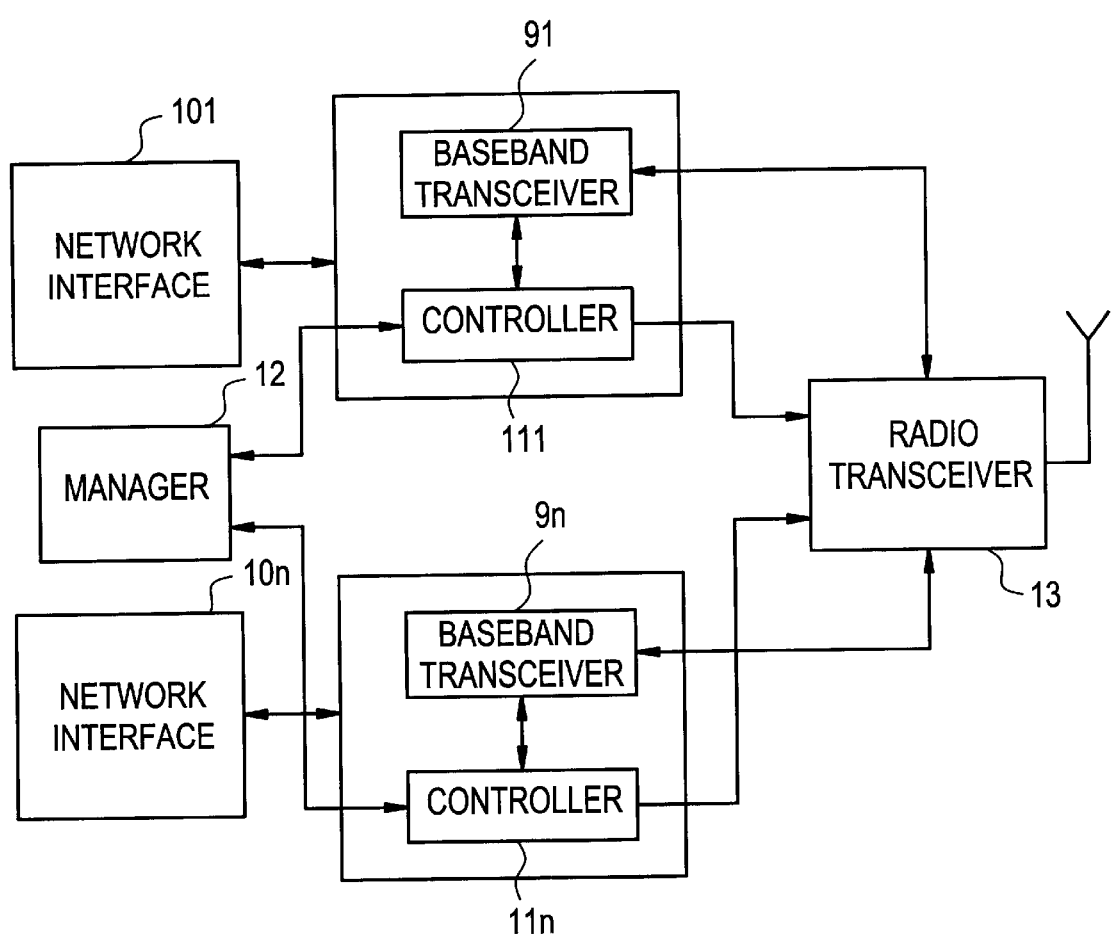
FIG. 3 shows the general architecture of a prior art radio access subsystem in a multiservice radio cellular system.

As shown in FIG. 3, and similarly, the radio access subsystem essentially comprises, for each of the n services supported by a cell:

baseband transceiver means such as 91 to 9n serving firstly to put information from network subsystem interface means such as 101 to 10n and specific to the service under consideration, into a form that is acceptable for transmission thereof over the radio interface, and secondly to reproduce information received in this form over the radio interface to said network subsystem interface means;

control means such as 111 to 11n serving in particular to transmit and receive various kinds of signaling as interchanged between the network and a mobile station in the various procedures or protocols provided to enable such a system to operate, and in particular in the presently-considered procedure of allocating radio resources, and more specifically, within this procedure:

when cell selection is performed in cooperation with mobile stations, transmitting and receiving the corresponding signaling information; and in all cases, transmitting signaling information specifying radio resources allocated to a mobile station for a given service.

The radio access subsystem also comprises means 12 for managing radio resources and to which the control means 111 to 11n address radio resource allocation requests within the selected cell for each of these services, and which respond by informing the control means of the allocated resources.

As also shown in FIG. 3, the radio access subsystem also comprises radio transceiver means 13 operating at a frequency which is controlled as a function of the radio resources allocated to the mobile stations.

For a fuller description of mobile radio cellular systems, and in particular such as the GSM system, reference can be made for example to the book by M. Mouly and M. B. Pautet, entitled "The GSM system for mobile communications" (Palaiseau, France, 1992, ISBN: 2-92507190-07-7).

In the invention, means are provided for coordinating the allocation of radio resources for the various services that are accessed simultaneously by a mobile station for the purpose of allocating different transmission channels for the various services that are all carried on the same carrier frequency for one such mobile station.

In general, given the way frequencies are distributed between cells within a cellular system, one condition for the frequency allocated to a given mobile station for the various services it is using being the same, could be that the same cell is selected for all of the various services; this can be the case in particular if the cells reusing the same frequencies are relatively far apart from one another. Different cells reusing the same frequencies could also be selected; this could be the case in particular if the cells reusing the same frequencies are relatively close to one another.

Figure 4:
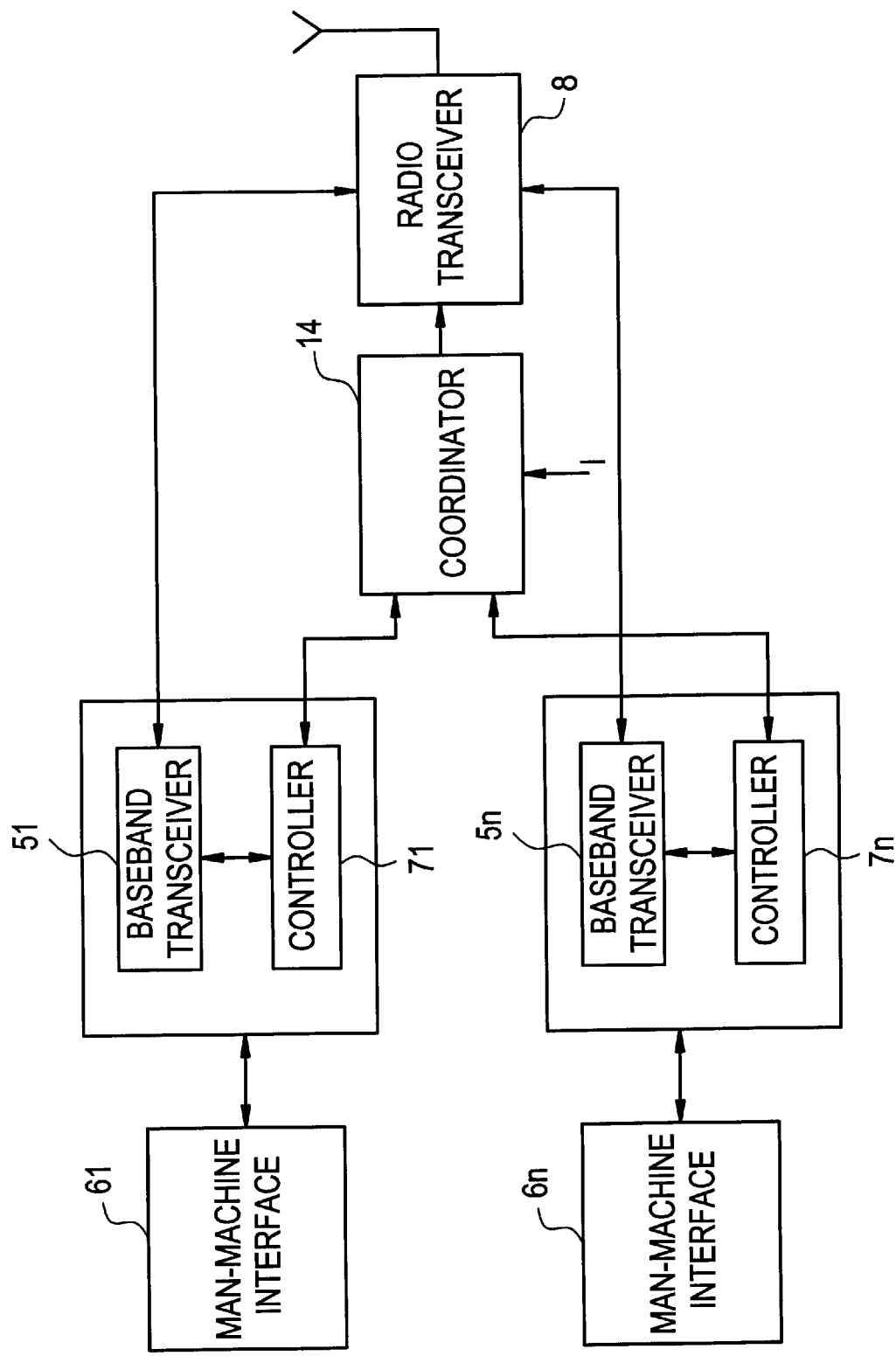
FIG. 4 illustrates the type of means that can be provided in mobile stations for said radio resource allocation of the invention.
Figure 5:
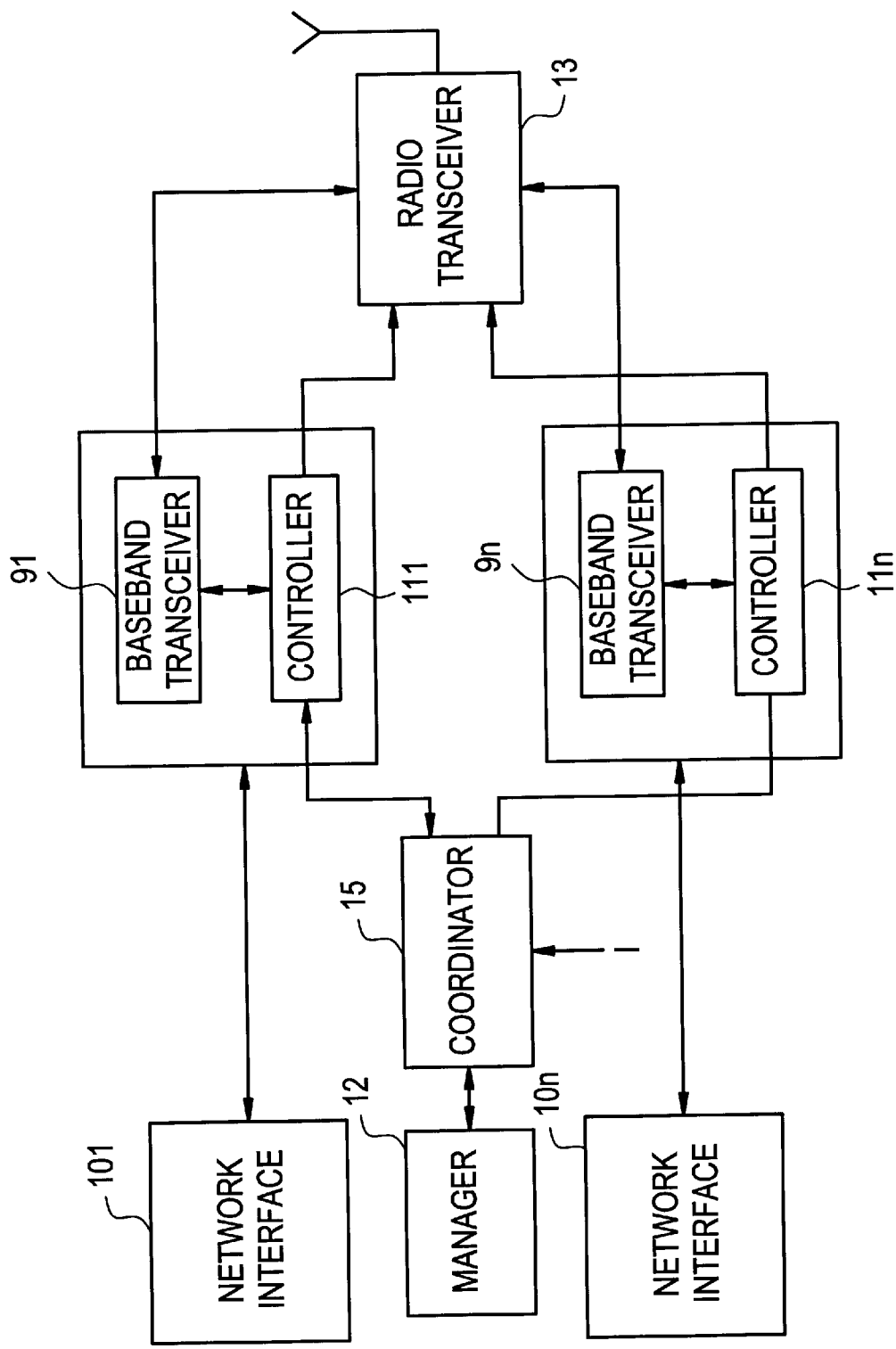
FIG. 5 shows the type of means that can be provided in the radio access subsystem for said allocation of radio resources in accordance with the invention.

Such coordination means can also be provided in the mobile stations and/or in the radio access subsystem, as illustrated in FIGS. 4 and 5, where elements identical to those shown in FIGS. 2 and 3 are given the same references.

When cell selection is performed in co-operation with the mobile stations, the coordination means can thus be provided in the mobile stations and in the radio access subsystem, where they are given respective references 14 and 15. They then co-operate to centralize the various kinds of signaling relating to cell selection for the various services accessed simultaneously by a mobile station, for the purpose of selecting for these various services either a single cell, or else different cells that reuse the same frequencies.

When the degree of co-operation with mobile stations is smaller, i.e. when cell selection is performed autonomously by the radio access subsystem, the coordination means 15 provided in the radio access subsystem serve to centralize the various kinds of signaling relating to cell selection for the various services accessed simultaneously by a mobile station for the purpose of selecting in autonomous manner one such cell, or different such cells that reuse the same frequencies.

In any event, the coordination means 15 provided in the radio access subsystem also serve to centralize the various radio resource allocation requests in the cell(s) selected in this way for the various services accessed simultaneously by a mobile station, and to reformulate such requests made to the radio resource management means for the purpose of allocating different transmission channels to these various services, all of which channels are carried on the same carrier frequency.

Such coordination means 14 and/or 15 are also controlled by information referenced I concerning simultaneous service detection, which information can in general be generated either by the mobile stations, by detecting that services are being used simultaneously in the mobile stations themselves, or else in the network subsystem by detecting that such simultaneous use of services is taking place in said network subsystem (where the network subsystem is the entity of the system in charge of managing calls).

In the first case, the simultaneous service detection information is communicated from the mobile station to the radio access subsystem in the form of signaling; in the second case, the simultaneous service detection information is communicated from the network subsystem to the radio access subsystem in the form of signaling, and depending on circumstances, i.e. depending on whether or not cell selection is performed in cooperation with the mobile stations, it may optionally be communicated to the mobile stations, likewise in the form of signaling.

The particular implementation of the coordination means 14 and/or 15 presents no particular difficulty for the person skilled in the art, so such means do not need to be described herein in detail greater than specifying their functions.

It should also be observed from the above that the term "cell selection" applies both to cell selection during initial access to the system and to cell selection during the handover of a call from one cell to another.

In addition, it will be observed that the present invention can also be considered as giving rise to a new cause for intercell handover, due to the fact that a single cell or different cells that reuse the same frequencies need to be selected for the various services being accessed simultaneously by a single mobile station.

In addition, the criteria used for such cell selection in accordance with the invention can, a priori, be arbitrary and left to assessment by the operator of the system under consideration, and can be the following, for example:

finding the best compromise between the various selection criteria used individually for each of the services;

minimizing the number of intercell handovers caused by using the present invention;

etc.

In addition, it should be observed that the present invention is not limited to the case when said transmission channels carried on a single carrier frequency are obtained by time division multiplexing, but it applies to any other multiplexing technique, and in particular code division multiplexing.

What is claimed is:

1. A system for allocation of radio resources to a mobile station in a multiservice mobile radio cellular system,
   wherein radio resource allocation for various services being accessed simultaneously by the mobile station is performed independently,
   wherein the radio resources are formed by transmission channels having multiple access using combinations of multiplexing techniques including frequency multiplexing, the system including coordination means for coordinating the allocation of radio resources for the various services accessed simultaneously by the mobile station, in order to allocate different channels carried by a single carrier frequency to the various services for the mobile station, and
   wherein the coordination means are controlled by simultaneous service detection information.

2. A system for allocation of radio resources according to claim 1, wherein the simultaneous service detection information is generated by the mobile station, which detects that simultaneous services are being used in the mobile station.

3. A system for allocation of radio resources according to claim 2, wherein the simultaneous service detection information is communicated from the mobile station to a radio access subsystem.

4. A system for allocation of radio resources according to claim 1, wherein the simultaneous service detection information is generated in a network subsystem that manages calls for the mobile station.

5. A system for allocation of radio resources according to claim 4, wherein the simultaneous service detection information is communicated from the network subsystem to a radio access subsystem.

6. A mobile station for the system of claim 1, wherein the coordination means are disposed in the mobile station.

7. An entity in a system according to claim 1, wherein the coordination means are disposed in the entity.

8. A system for allocation of radio resources to a mobile station in a multiservice mobile radio cellular system,
   wherein radio resource allocation for various services being accessed simultaneously by the mobile station is performed independently,
   wherein the radio resources are formed by transmission channels having multiple access using combinations of multiplexing techniques including frequency multiplexing, the system including coordination means for coordinating the allocation of radio resources for the various services accessed simultaneously by the mobile station, in order to allocate different channels to all the various services for the mobile station that are carried on a single carrier frequency, and
   wherein the coordination means are disposed in both the mobile station and a radio access subsystem, and wherein the coordination means use cooperation between the mobile station and the radio access subsystem in selecting one of a same cell and different cells reusing a same frequency, for allocation of the different channels.

9. A mobile station for the system of claim 8, wherein the coordination means are disposed in the mobile station.

10. An entity in a system according to claim 8, wherein the coordination means are disposed in the entity.

11. A system for allocation of radio resources to a mobile station in a multiservice mobile radio cellular system,
    wherein radio resource allocation for various services being accessed simultaneously by the mobile station is performed independently,
    wherein the radio resources are formed by transmission channels having multiple access using combinations of multiplexing techniques including frequency multiplexing, the system including coordination means for coordinating the allocation of radio resources for the various services accessed simultaneously by the mobile station, in order to allocate different channels to all the various services for the mobile station that are carried on a single carrier frequency, and
    wherein the coordination means reformulates allocation requests made to radio resource management means for allocating different ones of the transmission channels.

12. A mobile station for the system of claim 11, wherein the coordination means are disposed in the mobile station.

13. An entity in a system according to claim 11, wherein the coordination means are disposed in the entity.

14. A system for allocation of radio resources to a mobile station in a multiservice mobile radio cellular system,
    wherein radio resource allocation for various services being accessed simultaneously by the mobile station is performed independently,
    wherein the radio resources are formed by transmission channels having multiple access using combinations of multiplexing techniques including frequency multiplexing, the system including coordination means for coordinating the allocation of radio resources for the various services accessed simultaneously by the mobile station, in order to allocate different channels to all the various services for the mobile station that are carried on a single carrier frequency, and
    wherein a condition, used by the coordination means to allocate different channels carried by a single carrier frequency to the various services for the mobile station, includes one of selection of a single cell for allocation of all of the various services and selection of different cells reusing a same frequency for the various services.

15. A mobile station for the system of claim 14, wherein the coordination means are disposed in the mobile station.

16. An entity in a system according to claim 14, wherein the coordination means are disposed in the entity.

* * * * *